March 15, 1927.

A. L. HARVEY ET AL 1,621,011

MOTOR CONTROL SYSTEM

Filed Feb. 20, 1923

WITNESSES:

INVENTORS
Albert L. Harvey &
Niels K. Andersen
BY
ATTORNEY

Patented Mar. 15, 1927.

1,621,011

UNITED STATES PATENT OFFICE.

ALBERT L. HARVEY AND NIELS K. ANDERSEN, OF WILKINSBURG, PENNSYLVANIA, ASSIGNORS TO WESTINGHOUSE ELECTRIC AND MANUFACTURING COMPANY, A CORPORATION OF PENNSYLVANIA.

MOTOR-CONTROL SYSTEM.

Application filed February 20, 1923. Serial No. 620,290.

Our invention relates to motor-control systems and it has particular relation to control systems subject to considerable variation in line voltage.

The object of our invention is to afford suitable protection to motors subjected to variations in load current on account of variable line voltage.

Electric motors employed in mining operations are often subject to variable voltage on account of the fact that power is usually obtained from railway circuits. In the copending application of A. L. Harvey, Serial #620,129, filed Feb. 20, 1923 a system is described for the protection of motors, and apparatus co-operating therewith operating under the above-noted conditions.

The present invention comprises the use of reactance and resistance, not only for directly controlling the motor current, but also for controlling electroresponsive protective means in accordance with sudden changes in line potential.

Figure 1:
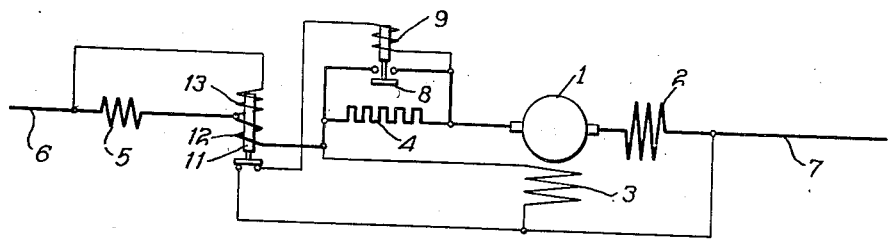
Figure 2:
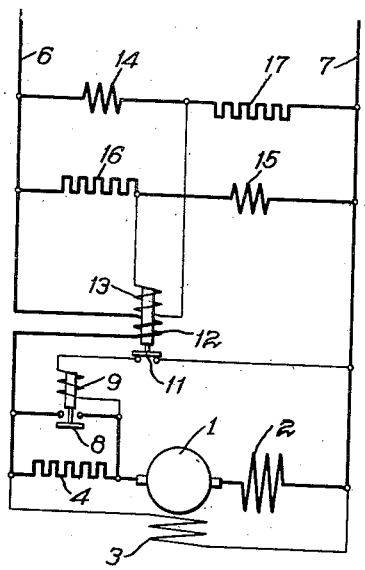
Figure 3:
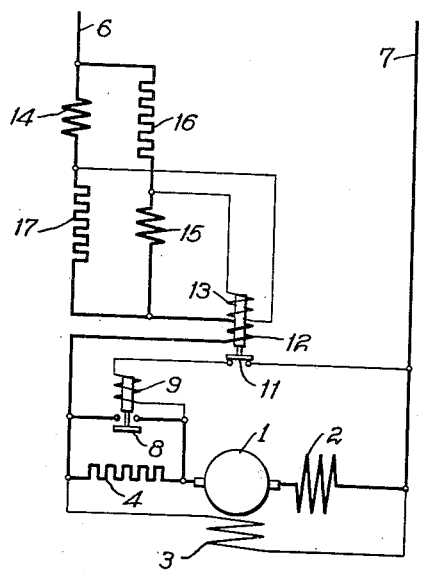

Our invention will be best understood with reference to the accompanying drawing in which, Figure 1 is a diagrammatic view of circuits and apparatus embodying our invention, and Figs. 2 and 3 illustrate, in diagrammatic form, modifications of the system represented in Fig. 1.

Referring to Fig. 1, a motor, having an armature 1 and series and shunt field-magnet windings 2 and 3, respectively, is operatively connected through a resistor 4 and a reactor 5 to line conductors 6 and 7. An electromagnetic switch 8, having an operating coil 9, is arranged for controlling resistor 4. A relay 11 is provided with a series operating coil 12 that is connected in circuit with armature 1 for controlling coil 9. Relay 11 is also provided with a coil 13 that is connected in shunt relation to reactor 5. Coils 12 and 13 are cumulative in their action upon relay 11. Resistor 4 may be utilized for effecting acceleration of the motor as well as for protection, as hereinafter described, when the motor is subjected to fluctuations in voltage. While we have shown a single switch and resistor, for the purpose of more clearly describing our invention, it is to be understood that a plurality of accelerating switches may be employed, if desired.

Assuming the apparatus in its illustrated and inoperative position, if energy is supplied to line conductors 6 and 7, current will traverse the series field winding 2, armature 1, resistor 4, relay coil 12 and reactor 5. As the armature 1 is accelerated, switch 8 is closed to shunt resistor 4. Coil 9 is connected in shunt relation to armature 1 through relay 11 and is, of course, dependent for its closure upon a predetermined increase in the electromotive force across the armature. Relay 11, on account of its series coil 12, may be employed as a throttle or accelerating relay. Coil 12 also serves as a holding coil, as hereinafter described, in conjunction with coil 13.

For a given line voltage, the motor armature 1 develops a certain counter-electromotive force, in accordance with load conditions. Assuming a given value of current traversing armature 1 and reactor 5, and that armature 1 is rotating at a normal speed, there will be substantially no voltage drop across reactor 5 since, as is well understood, a reactor is usually designed to have relatively low resistance. It has, however, a high impedance effect against sudden fluctuations of current.

Under normal conditions coil 13 is thus substantially deenergized and, at a normal armature current, relay 11 is closed. If the above-noted railway load, drawn from the same supply circuit as the load of the present motor, is suddenly relieved, there will be a sudden increase in voltage applied to line conductors 6 and 7. Reactor 5 opposes the passage of current induced by the increase in line voltage so that, momentarily, there is an increased difference in potential between the voltage across armature 1 and the line voltage. Consequently, coil 13 is energized in accordance with the drop in potential across reactor 5, which is connected between points now having a material difference in potential, for the reason stated, and relay 11 is thereby operated to interrupt the circuit through coil 9, whereupon switch 8 opens to reinsert resistor 4 in circuit with armature 1, so that the armature is protected against the current inrush that presently overcomes the impedance of reactor 5.

When current traversing armature 1 becomes normal, either on account of a change in speed and counter-electromotive force of armature 1 or on account of the current-limiting effect of resistor 4, coil 12 permits relay 11 to close and reestablish a circuit for coil 9, whereupon resistor 4 is again short-circuited.

Referring now to Fig. 2, a plurality of reactors 14 and 15, preferably of relatively high resistance, and resistors 16 and 17 are connected in a Wheatstone bridge arrangement including coil 13 of relay 11. Coil 13 is connected in the "galvanometer circuit" of the standard Wheatstone bridge. For a normal and substantially steady voltage applied to conductors 6 and 7, there is no difference in potential between the terminals of coil 13 so that, when armature 1 is operating at a normal speed corresponding to the impressed voltage, relay 11 and switch 8 are closed. Upon a sudden increase in the voltage across conductors 6 and 7, there is a corresponding increase in voltage drop across resistors 16 and 17. Momentarily, however, there is no increase in current through reactors 14 and 15. Consequently, current now traverses coil 13 from conductor 6 through resistor 16, coil 13, and resistor 17 to conductor 7, whereupon relay 11 is operated to interrupt the circuit for coil 9, as previously described in connection with Fig. 1. Coil 12 also acts as a holding coil and maintains relay 11 inoperative until normal conditions again obtain.

According to Fig. 3 of the drawing, coil 13 is connected in a Wheatstone bridge arrangement in which the bridge is connected in series relation to armature 1 instead of in shunt relation, as shown in Fig. 2. With this series arrangement the effect of the inductance of the motor armature 1 and series field-magnet winding 2 is added to that of reactors 14 and 15, so that there is an increased impedance to sudden fluctuations in current through armature 1. Coil 13, however, is controlled in accordance with the voltage conditions obtaining in the Wheatstone bridge comprising the elements 14, 15, 16 and 17, so that relay 11 operates in a manner similar to that described in connection with Fig. 2.

The advantages of our system, as herein set forth, will be at once apparent to those skilled in the art, and various modifications may be made therein in accordance with the requirements of various motor-control applications.

We claim as our invention:

1. The combination with a motor having an armature and current-limiting means therefor, of a Wheatstone bridge comprising resistance and reactance and electro-responsive means therein for controlling said current-limiting means.

2. The combination with a motor having an armature and current-limiting means therefor, of a Wheatstone bridge comprising resistance and reactance and electro-responsive means therein for controlling said current-limiting means, said bridge being in shunt relation to the armature.

3. The combination with a motor having an armature and current-limiting means therefor, of a Wheatstone bridge comprising resistance and reactance and electro-responsive means therein for controlling said current-limiting means, said bridge being in circuit with the armature.

In testimony whereof, we have hereunto subscribed our names this 14th day of February, 1923.

ALBERT L. HARVEY.
NIELS K. ANDERSEN.